United States Patent Office 3,315,526
Patented Apr. 25, 1967

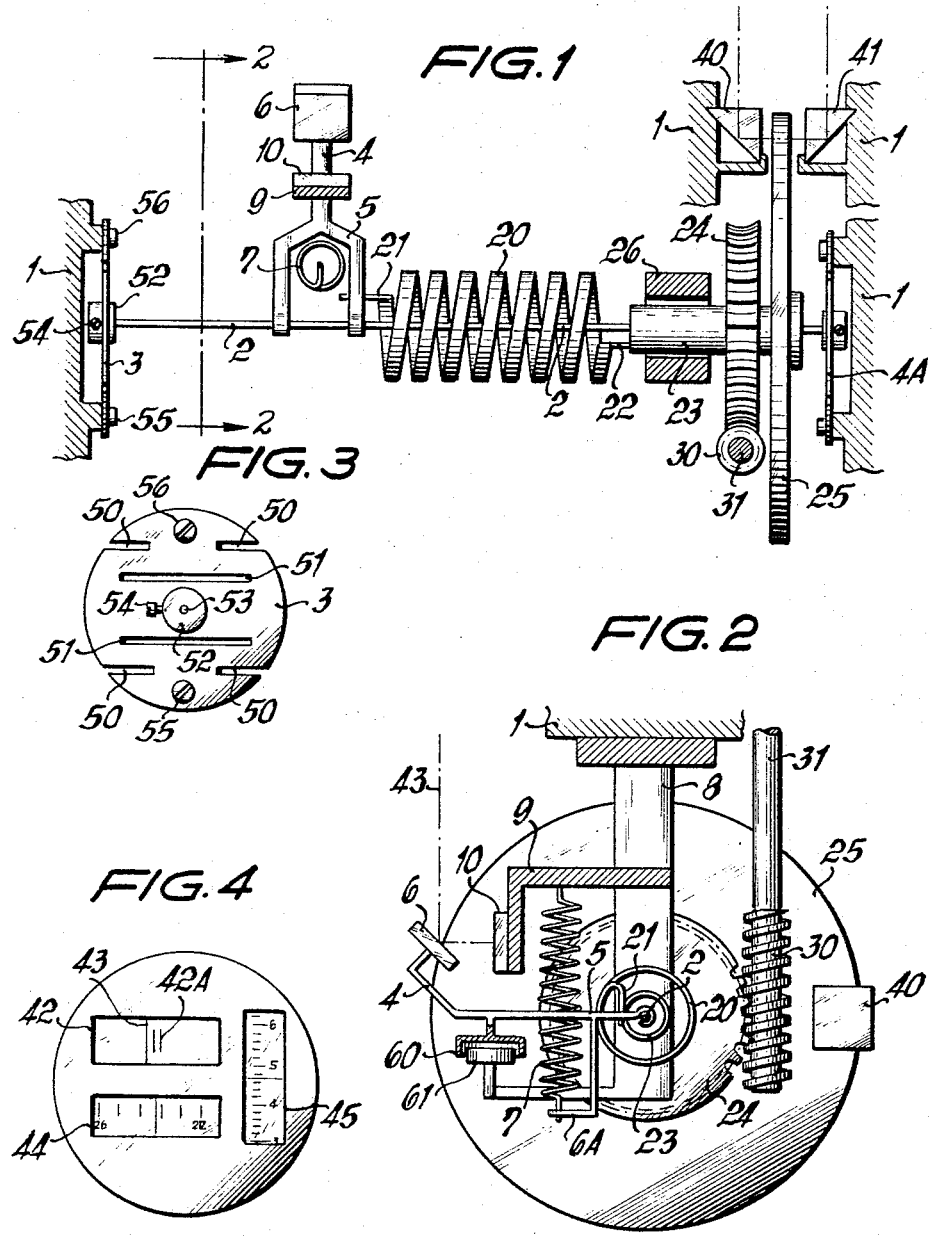

3,315,526
HORIZONTAL-SUSPENSION GRAVIMETER
Reinhard Schulze, Berlin-Lankwitz, Germany, assignor to Continental Elektroindustrie A.G. Askania-Werke, Berlin-Mariendorf, Germany, a corporation of Germany
Filed Apr. 23, 1965, Ser. No. 450,345
Claims priority, application Germany, Apr. 24, 1964, C 32,718
2 Claims. (Cl. 73—383)

This invention relates to a novel construction for a gravimeter, and more particularly to the type of gravimeter having a weight assembly which is mounted for rotation about a horizontal axis, the weight being balanced in the horizontal plane of the axis in its null or balanced position.

Gravimeters of this type heretofore known have in general proved impractical for gravity measurements of high sensitivity and accuracy. In one well-known construction, the suspension consists of a pair of torsion springs extending to opposite horizontally spaced supports, the inner ends of the torsion springs being secured to the weight assembly. The weight, normally on an arm extending radially from the suspension, is balanced by rotation of the support framework for the outer ends of the springs, the balanced condition being achieved in the horizontal position of the weight, which is of course the position in which the torque exerted on the weight assembly by the springs is equal to the torque exerted by gravity. The rotational position of the ends of the suspension may accordingly be calibrated in terms of gravity or, as is more usual, in terms of relation to a gravitational field in which an earlier standardizing measurement is made.

In such a construction, it will be seen, the accuracy is greatly limited. It is frequently desired to make measurements of gravity change of the order of one part in $10^7$ or $10^8$. With the construction described, the torque exercised by the springs must be reproducible to such an accuracy, which is found virtually impossible, since the effects of elastic hysteresis are normally of this magnitude after any substantial deflection.

In an arrangement devised to meet this problem of limit of sensitivity and accuracy, the springs mentioned above, forming the suspension, are used solely for the original or reference balancing, a separate, relatively delicate and light, spring being used to restore the balance in the changed gravitational field. In U.S. Patent 2,183,115, there are shown constructions of this nature, employing a coiled torsion spring surrounding one of the two suspension springs, and provided with a calibration indicator to show the differential in gravity represented by the differential in force exerted by the auxiliary measuring spring in restoring the balance.

The present invention stems from the finding that the problems and limitations of this type of gravimeter are not adequately solved by the type of construction just mentioned. As in the earlier forms of such constructions, the suspension, in addition to exerting torque, also bears the vertical load of the entire weight of the weight assembly, which of course is a deforming force magnifying the hysteresis error. This error, furthermore, remains substantial, even though it may be somewhat reduced because of the permissibility of using springs of a type required to retain torsion calibration reproducibility at only one value.

In the present construction, both the original or primary balancing torque or force and the auxiliary or rebalancing torque or force are obtained independently of the suspension which supports the entire weight assembly against vertical motion. This suspension is essentially free of torque exerted on the weight assembly, any rotational restoring force being very small compared with the forces exerted by the separately provided springs, and particularly the primary balancing spring, so that the accuracy of the measurement is not limited by the difficulty of maintaining constancy of torque force in a spring designed to perform the dual task of maintaining the position of the axis of rotation in the vertical plane, while at the same time balancing the torque about that axis also produced by the gravitational field. Thus, in the present construction, separate elements are provided for vertical support of the rotational axis and for the balancing and auxiliary restoring forces. As a result, there is achieved, in a relatively simple manner, a reproducibility and accuracy and sensitivity not obtainable heretofore with devices of comparable simplicity.

As a further feature of the invention, there is provided a novel and convenient form of adjustment and read-out for a gravimeter of this type, the high accuracy now permitted by removal of the previous inherent limitations in the measuring elements themselves requiring a correspondingly high accuracy of adjustment and reading in order that the potentialities of the basic mechanism be fully realized. The teachings of the invention in this regard, together with certain other and further narrower aspects of the invention, will best be understood from the description of the embodiment of the invention illustrated in the drawing, in which:

FIGURE 1 is a top plan view of the basic parts of a gravimeter mechanism made in accordance with the invention, the housing thereof being shown fragmentarily in section;

FIGURE 2 is a transverse sectional view taken along the line 2—2 of FIGURE 1, but showing prism 40 in a diametrically opposite position to provide greater clarity of illustration;

FIGURE 3 is a view in elevation of a support plate for the suspension, constituting a portion of the device; and FIGURE 4 is a more or less schematic elevational view showing a read-out indicator of the gravimeter.

The gravimeter is mounted in a housing, shown only fragmentarily in the drawing, portions thereof being indicated by the reference numeral 1. The suspension 2 is a fine thread or ribbon of the type used in quadrant electrometers and similar devices for torque-free rotational support. Its outer ends are mounted by means of mounting plates 3 and 4A, to be further described later. The horizontal suspension 2 serves as the vertical support for the weight assembly 4, consisting of a bifurcated or fork-shaped support portion 5 bearing an arm at the end of which is mounted a tilted mirror 6 (which may of course be supplemented with an auxiliary weight, if desired). A dependent tongue 6A is secured to the lower end of a tension spring 7, the upper end of which is mounted on a post 8 secured to the housing by means of a bracket 9 bearing a scribed plate 10. If desired, a tension adjustment (not shown) may be provided at either end of spring 7.

The tension spring 7 supports the weight assembly against the torque exerted by gravity, exactly counterbalancing the rotational force. However, it will be noted that the rotational axis itself is vertically supported by the suspension 2.

A helical torsion spring 20 has one end 21 secured to the support portion 5 of the weight assembly and the opposite end 22 secured to a hollow shaft or sleeve 23. The suspension 2 extends through the axis of the surrounding spring 20 and the hollow shaft 23 to its support plate 4A on the housing 1. The shaft 23 bears a worm gear 24 and a glass circular scale 25, and is rotatably mounted in a bushing 26 mounted in the post 8 (not shown in FIGURE 1). A worm 30 on the end of an adjusting shaft 31 forms a micrometer adjustment for positioning of the scale 25, and, correspondingly, adjustment of the torsion of the spring 20, which may thus be read from the scale, with interpolation made by a suitable micrometer.

The scale 25, transparent except for its engraved markings, is illuminated by means of a prism 40, the reading being reflected by a prism 41 and being displayed visually in close adjacency to other indications. In a particular embodiment, shown in FIGURE 4, the viewing is done in a reading microscope, of which the overall field is shown in that figure. In the window or area 42, there appears a luminous marker produced by plate 10 and mirror 6, varying in position in the field with the position of the weight assembly, appearing between fixed markers 42A when the weight assembly is in its reference horizontal position. The second field or window 44 displays the image of the calibrated scale 25, and interpolation of this scale is made by imaging of the scale 45 of a conventional interpolation micrometer (not shown).

The plate 3 mounting one of the ends of the suspension 2 is seen in FIGURE 3 (being identical to the plate at the opposite end). The plate is formed of a resilient material and its flexibility is aided by slots 50 and 51. A bushing 52 is centrally mounted, having an axial aperture receiving the suspension thread or ribbon 2, which is secured by a clamping screw 54 (a suitable cement or other securing means being suitable for supplementation or substitution). The plate is mounted by means of screws 55 and 56; it is of sufficient stiffness to produce complete tautness of the suspension 2, the ends of which are preferably aligned in the reference position to assure zero torque application to the weight system in that position. Thus in this position, the entire gravitational torque load is borne solely by the spring 7.

Air damping of motion of the weight system is provided by a dashpot arrangement having a cup element 60 on the weight assembly and a piston element 61 mounted on an extension of the post 8 secured to the housing.

The manner of operation of the device will be readily understood from the description already given. The gravimeter is adjusted at a location of known gravitational force to produce the balanced condition in which the marker 43 in the field 42 is coincident with the index marks 42A. Upon moving the gravimeter to a location with a different gravitational field, the spindle or shaft 31 is adjusted to restore this condition. The torsion change in the spring 20 is then indicated by the scale in the field of view 44, interpolated by means of the micrometer reading in the field of view 45.

Many changes and alterations will readily be observed by persons skilled in the art, although the construction illustrated is particularly advantageous. Some of such modifications will be readily obvious. For example, it is obviously within the broader teachings of the invention to employ as the primary balancing spring, in place of the tension spring 7, a torsion spring surrounding the portion of the suspension 2 opposite the portion surrounded by the adjustment spring 20. The suspension, shown as a single unitary element, may of course be of two-piece construction. Other obvious modifications include various adjustments, etc. Other modifications, less obvious, will readily become apparent upon study.

One construction of the illustrated embodiment provided a measuring range of about 5,000 mgal. with an accuracy of about 0.01 mgal., without any readjustment of the balance position. This was done with a 400 degree rotation (small overlap of calibration points at the ends of the range) of the scale 25, i.e., slightly more than one full turn of the end of the torsion spring 20.

In view of the many possible modifications which remain within the teachings of the invention, the scope of the protection to be afforded the invention should not be limited to the particular embodiment illustrated, but should extend to all usages of the basic construction as set forth in the appended claims, and equivalents thereof.

What is claimed is:

1. In a gravimeter, a housing, an elongated horizontal thread-like suspension having its ends secured to the housing, a weight assembly mounted on the suspension and extending radially therefrom, a tension spring having one end secured to the weight assembly and the other end secured to the housing, a hollow shaft surrounding an end portion of the suspension, a calibrated dial member mounted on the shaft to form a rotatable adjustment assembly, a helical torsion spring surrounding the suspension and having one end secured to the weight assembly and the other end secured to the adjustment assembly, and means for producing, in close adjacency, visual indications of the positions of the weight assembly and dial member.

2. In a gravimeter of the type having a housing, an elongated horizontal suspension having its ends secured to the housing, a weight assembly mounted on the suspension and extending therefrom, primary spring means for balancing the weight in the horizontal position, and auxiliary calibrated adjustable spring means for restoring the weight to the horizontal position to measure changes in gravity, the improved construction wherein both said spring means are separate from the suspension so that the suspension is substantially free of torque in the balanced position, said primary spring means comprising a first spring connected between the weight assembly and the housing, and said auxiliary spring means comprising a torsion spring surrounding the suspension and having its inner end connected to the weight assembly and its outer end to an adjustment member rotatably mounted on the housing, the adjustment member being apertured and the suspension passing therethrough.

References Cited by the Examiner

UNITED STATES PATENTS

| | | | |
|---|---|---|---|
| 1,898,534 | 2/1933 | Hartley | 73—382 |
| 2,417,392 | 3/1947 | Craig et al. | 73—383 |
| 2,571,839 | 10/1951 | Conover et al. | 73—382 |
| 2,732,718 | 1/1956 | Cornelison | 73—382 |
| 2,907,211 | 10/1959 | Breazeale et al. | 73—382 |

RICHARD C. QUEISSER, *Primary Examiner.*

C. I. McCLELLAND, *Assistant Examiner.*